(12) United States Patent
Nakano et al.

(10) Patent No.: US 11,835,245 B2
(45) Date of Patent: Dec. 5, 2023

(54) AIR CONDITIONING SYSTEM, AND INDOOR UNIT OF SAME

(71) Applicant: DAIKIN INDUSTRIES, LTD., Osaka (JP)

(72) Inventors: Akihiro Nakano, Osaka (JP); Fumika Masuda, Osaka (JP); Seiji Oka, Osaka (JP)

(73) Assignee: Daikin Industries, Ltd., Osaka (JP)

( * ) Notice: Subject to any disclaimer, the term of this patent is extended or adjusted under 35 U.S.C. 154(b) by 0 days.

(21) Appl. No.: 18/119,065

(22) Filed: Mar. 8, 2023

(65) Prior Publication Data
US 2023/0221025 A1 Jul. 13, 2023

Related U.S. Application Data

(63) Continuation of application No. PCT/JP2021/021956, filed on Jun. 9, 2021.

(30) Foreign Application Priority Data

Sep. 24, 2020 (JP) .................................. 2020-159856

(51) Int. Cl.
*F24F 11/36* (2018.01)
*F24F 11/46* (2018.01)

(52) U.S. Cl.
CPC .............. *F24F 11/36* (2018.01); *F24F 11/46* (2018.01)

(58) Field of Classification Search
CPC . F25B 2500/22; F25B 2500/222; F24F 11/36; F24F 11/46
See application file for complete search history.

(56) References Cited

U.S. PATENT DOCUMENTS

| 9,791,195 B2 * | 10/2017 | Okada ...................... F24F 11/30 |
| 2004/0111697 A1 * | 6/2004 | Johnson ................ F25B 49/005 |
| | | 717/104 |
| 2012/0318011 A1 * | 12/2012 | Ochiai .................. F25B 49/005 |
| | | 62/127 |

(Continued)

FOREIGN PATENT DOCUMENTS

| GB | 2575606 A | 1/2020 |
| JP | 2015-117931 A | 6/2015 |

(Continued)

OTHER PUBLICATIONS

International Preliminary Report on Patentability and English translation of the Written Opinion of the International Searching Authority, for International Application No. PCT/JP2021/021956, dated Apr. 6, 2023.

(Continued)

*Primary Examiner* — Nelson J Nieves
(74) *Attorney, Agent, or Firm* — Birch, Stewart, Kolasch & Birch, LLP

(57) ABSTRACT

This air conditioning system includes a refrigerant circuit including an indoor heat exchanger of an indoor unit and an outdoor heat exchanger of an outdoor unit, and a detection unit capable of detecting a refrigerant leaking from the indoor unit. The detection unit is capable of switching between an energized state and a non-energized state on the basis of information on a refrigerant filling amount by which the refrigerant circuit is filled with the refrigerant.

10 Claims, 9 Drawing Sheets

(56) References Cited

U.S. PATENT DOCUMENTS

| | | | |
|---|---|---|---|
| 2015/0233622 A1* | 8/2015 | Yajima | F25B 49/005 |
| | | | 62/129 |
| 2017/0328593 A1* | 11/2017 | Enya | F24F 11/89 |
| 2018/0187917 A1 | 7/2018 | Suzuki et al. | |
| 2019/0226705 A1* | 7/2019 | Sakae | F25B 1/00 |
| 2020/0182734 A1* | 6/2020 | Ueno | G01N 27/70 |
| 2022/0099346 A1* | 3/2022 | Alfano | F24F 11/36 |
| 2022/0128282 A1* | 4/2022 | Butler | F24F 11/36 |
| 2022/0235975 A1* | 7/2022 | Ohura | F25B 41/40 |
| 2022/0349600 A1* | 11/2022 | Alfano | F24F 11/49 |
| 2022/0404053 A1* | 12/2022 | Kuroda | F24F 11/32 |

FOREIGN PATENT DOCUMENTS

| | | |
|---|---|---|
| JP | WO2017/026147 A1 | 8/2017 |
| WO | WO 2018/220758 A1 | 12/2018 |

OTHER PUBLICATIONS

International Search Report (PCT/ISA/210) issued in PCT/JP2021/021956, dated Jul. 13, 2021.
Written Opinion of the International Searching Authority (PCT/ISA/237) issued in PCT/JP2021/021956, dated Jul. 13, 2021.

* cited by examiner

AIR CONDITIONING SYSTEM, AND INDOOR UNIT OF SAME

CROSS REFERENCE TO RELATED APPLICATIONS

This application is a Continuation of PCT International Application No. PCT/JP2021/021956 filed on Jun. 9, 2021, which claims priority under 35 U.S.C. § 119(a) to Patent Application No. 2020-159856 filed in Japan on Sep. 24, 2020, all of which are hereby expressly incorporated by reference into the present application.

TECHNICAL FIELD

The present disclosure relates to an air conditioning system and an indoor unit of the same.

BACKGROUND ART

An air conditioning system in the related art includes a refrigerant circuit that circulates a refrigerant, and a heat exchanger unit including a fan and a refrigerant detection means of an energization type (see WO 2017/026147 A). In the above-described air conditioning system, energization to the refrigerant detection means is interrupted when a rotational speed of the fan becomes equal to or higher than a preset threshold, and the refrigerant detection means is energized when the rotational speed of the fan becomes lower than a different preset threshold.

SUMMARY

An air conditioning system according to the present disclosure includes a refrigerant circuit having a configuration where an indoor heat exchanger of an indoor unit and an outdoor heat exchanger of an outdoor unit are connected via a refrigerant connection pipe, a detection unit capable of detecting a refrigerant leaking from the indoor unit, in which the detection unit is capable of switching between an energized state and a non-energized state on the basis of information on a refrigerant filling amount by which the refrigerant circuit is filled with the refrigerant.

DESCRIPTION OF EMBODIMENTS

With reference to the attached drawings, a description will be given below of embodiments of the present disclosure.

First Embodiment

Figure 1:
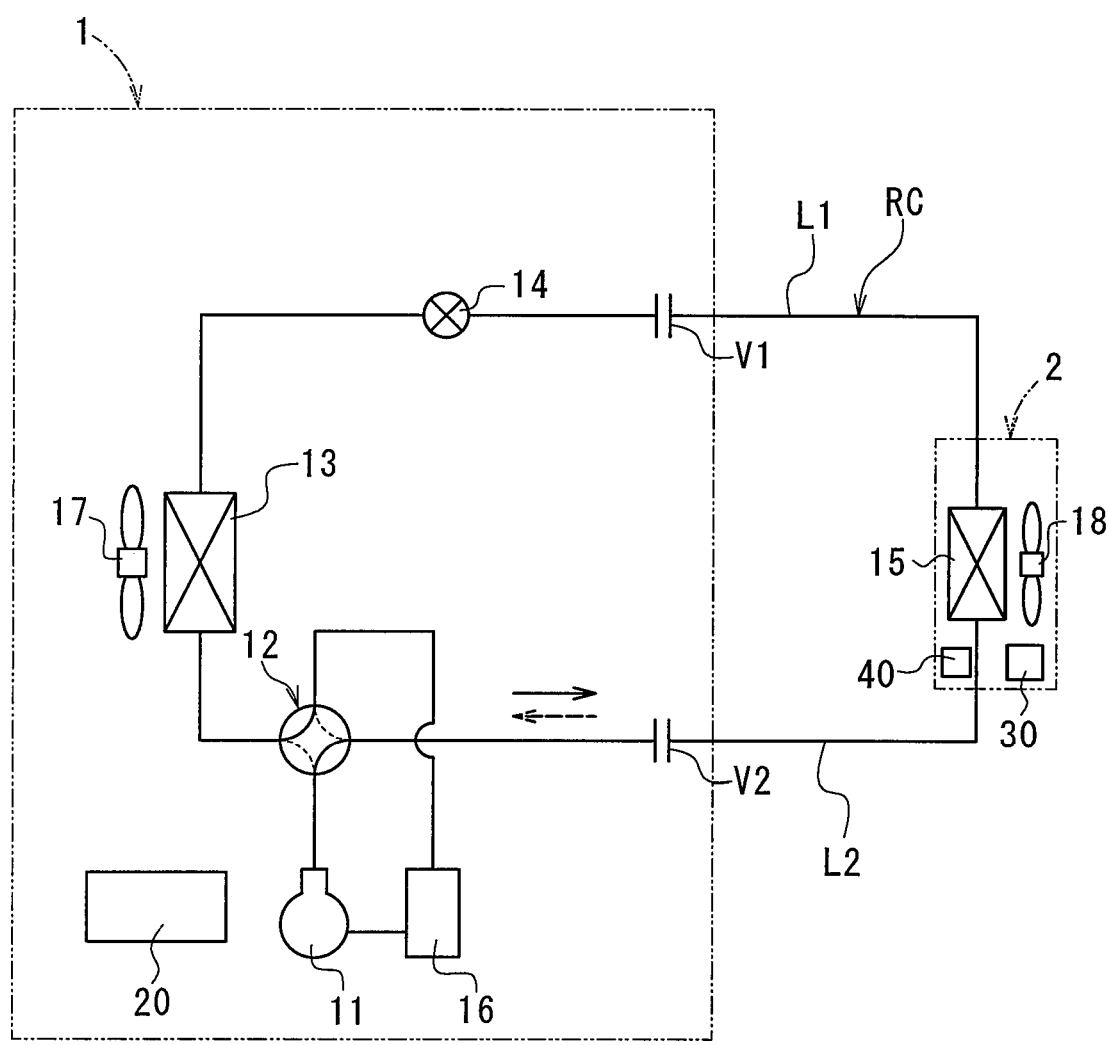
FIG. 1 is a schematic configuration diagram of an air conditioning system according to a first embodiment of the present disclosure.

FIG. 1 is a schematic configuration diagram of an air conditioning system according to the present embodiment.
(Configuration of Air Conditioning System)

FIG. 1 is a diagram illustrating a refrigerant circuit RC provided in the air conditioning system according to the present embodiment. This air conditioning system is an air conditioning system of a pair type in which one outdoor unit 1 and one indoor unit 2 are connected.

The above-described air conditioning system includes a compressor 11, a four-way switching valve 12, an outdoor heat exchanger 13, an electric expansion valve 14, an indoor heat exchanger 15, and an accumulator 16. The compressor 11 has a discharge side connected to one end of the four-way switching valve 12. The four-way switching valve 12 has another end connected to one end of the outdoor heat exchanger 13. The outdoor heat exchanger 13 has the other end connected to one end of the electric expansion valve 14. The electric expansion valve 14 has the other end connected to one end of the indoor heat exchanger 15 via a connection pipe connecting part V1 and a connection pipe L1. The indoor heat exchanger 15 has the other end connected to one end of the accumulator 16 via a connection pipe L2, a connection pipe connecting part V2, and the four-way switching valve 12. Further, the accumulator 16 has the other end connected to a suction side of the compressor 11.

The compressor 11, the four-way switching valve 12, the outdoor heat exchanger 13, the electric expansion valve 14, the indoor heat exchanger 15, and the accumulator 16 each constitute a part of the refrigerant circuit RC of the air conditioning system. This refrigerant circuit RC is filled with an R32 refrigerant. The refrigerant circuit RC according to the present embodiment has a maximum filling capacity of 1.5 kg.

The connection pipe connecting parts V1, V2 according to the present embodiment are shutoff valves. The connection pipe connecting part V1 and the connection pipe connecting part V2 constitute one connecting port. That is, the outdoor unit 1 is adaptable only to an air conditioning system of a pair type.

Further, the outdoor unit 1 is equipped with the compressor 11, the four-way switching valve 12, the outdoor heat exchanger 13, the electric expansion valve 14, the accumulator 16, and an outdoor fan 17. The outdoor unit 1 includes an outdoor control device 20 that controls the compressor 11 and the outdoor fan 17. The outdoor unit 1 according to the present embodiment has a cooling rated capacity of 5.0 kW.

On the other hand, the indoor unit 2 is equipped with the indoor heat exchanger 15 and an indoor fan 18. The indoor unit 2 includes an indoor control device 30 that controls the indoor fan 18 and the like on the basis of a signal from a remote controller (not illustrated) or an indoor temperature sensor (not illustrated). The indoor unit 2 further includes a refrigerant leak sensor 40 that detects leakage of the refrigerant in the indoor unit 2. The indoor unit 2 according to the present embodiment is an indoor unit of a floor-standing type. The refrigerant leak sensor 40 according to the present embodiment is an example of a detection unit according to the present disclosure.

The above-described air conditioning system switches the four-way switching valve 12 to a switching position indicated by a solid line and activates the compressor 11 for heating operation, and switches the four-way switching valve 12 to a switching position indicated by a dotted line and activates the compressor 11 for cooling operation and dehumidifying operation. Note that a direction of a solid arrow indicates a direction in which the R32 refrigerant flows during the heating operation. A direction of a dotted arrow indicates a direction in which the R32 refrigerant flows during the cooling operation and dehumidifying operation.

Figure 2:
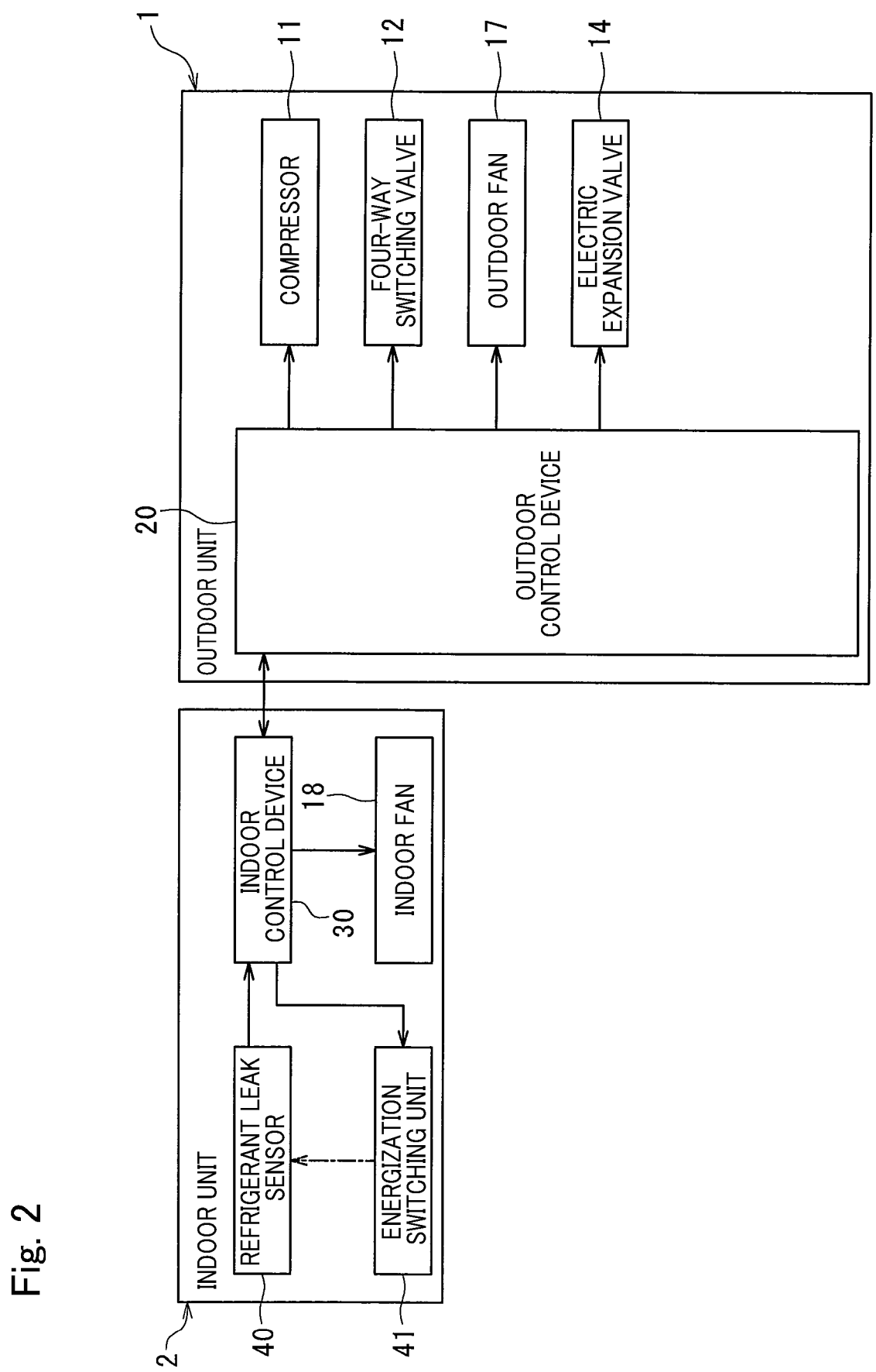
FIG. 2 is a control block diagram of the air conditioning system according to the first embodiment.

FIG. 2 is a control block diagram of the air conditioning system according to the present embodiment.

The outdoor control device 20 includes a microcomputer, an input/output circuit, and the like. With reference to FIG. 2, the compressor 11, the four-way switching valve 12, the outdoor fan 17, the electric expansion valve 14, and the indoor control device 30 of the indoor unit 2 are connected to the outdoor control device 20. The outdoor control device 20 includes, for example, a storage unit (not illustrated) including a non-volatile memory. The above-described storage unit stores a type of the outdoor unit 1, the number N of indoor units 2 connected to the outdoor unit 1, the number M of connecting ports provided in the outdoor unit 1, a rated capacity W of the outdoor unit 1, and a maximum filling capacity Cmax up to which the refrigerant circuit RC is allowed to be filled with the refrigerant.

Further, the indoor unit 2 according to the present embodiment is equipped with the indoor fan 18, the refrigerant leak sensor 40, an energization switching unit 41, and the indoor control device 30.

The refrigerant leak sensor 40 detects leakage of the refrigerant in the indoor unit 2. Specifically, the refrigerant leak sensor 40 detects a refrigerant concentration in the air. When the refrigerant concentration exceeds a predetermined threshold, the refrigerant leak sensor 40 outputs a signal indicating detection of leakage to the indoor control device 30. The refrigerant leak sensor 40 according to the present embodiment is an example of the detection unit according to the present disclosure.

The energization switching unit 41 is connected to the refrigerant leak sensor 40 so as to be able to supply power to the refrigerant leak sensor 40. The refrigerant leak sensor 40 is brought into an energized state when power is supplied from the energization switching unit 41, and is brought into a non-energized state when power supply from the energization switching unit 41 is interrupted. That is, the refrigerant leak sensor 40 can be switched between the energized state and the non-energized state by the energization switching unit 41.

The indoor control device 30 includes a microcomputer, an input/output circuit, and the like. The indoor fan 18, the refrigerant leak sensor 40, the energization switching unit 41, and the outdoor control device 20 are connected to the indoor control device 30. The outdoor control device 20 and the indoor control device 30 perform air conditioning operation in a cooperative manner via mutual communications over a communication line (not illustrated).

The indoor control device 30 outputs, to the indoor fan 18, a drive signal for driving the indoor fan 18. Further, the indoor control device 30 receives, from the refrigerant leak sensor 40, a signal indicating detection of leakage of the refrigerant. The indoor control device 30 outputs, to the energization switching unit 41, a control signal for switching the refrigerant leak sensor 40 to either the energized state or the non-energized state.

The air conditioning system according to the present embodiment is not limited to the connection example (first connection example) in which one indoor unit 2 is connected to the outdoor unit 1 adaptable only to an air conditioning system of a pair type as described above. The air conditioning system according to the present embodiment may have a configuration such as a second connection example or a third connection example to be described below, or may have a configuration different from such examples.

Second Connection Example

Figure 3:
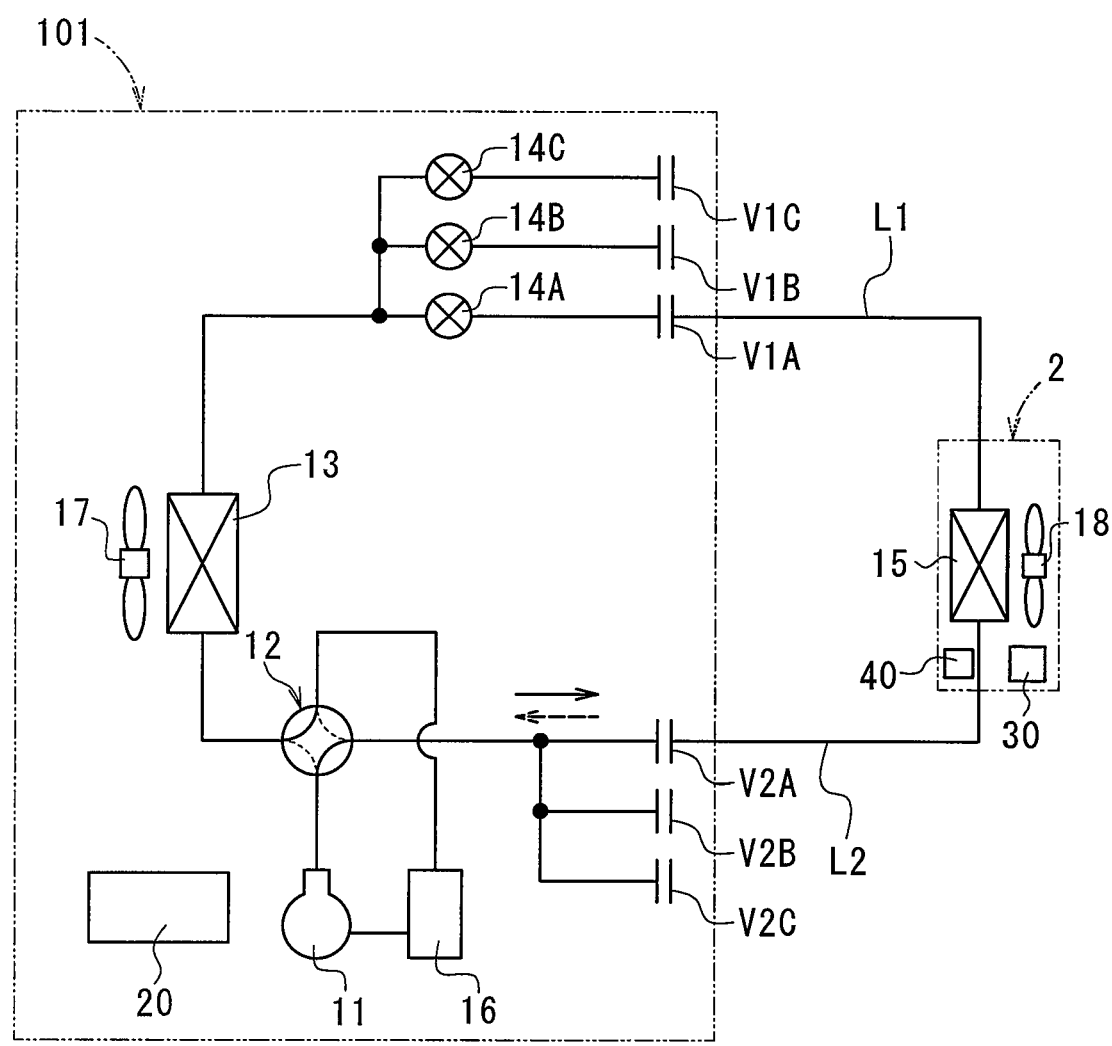
FIG. 3 is a schematic configuration diagram of an air conditioning system according to a second connection example of the first embodiment.
Figure 4:
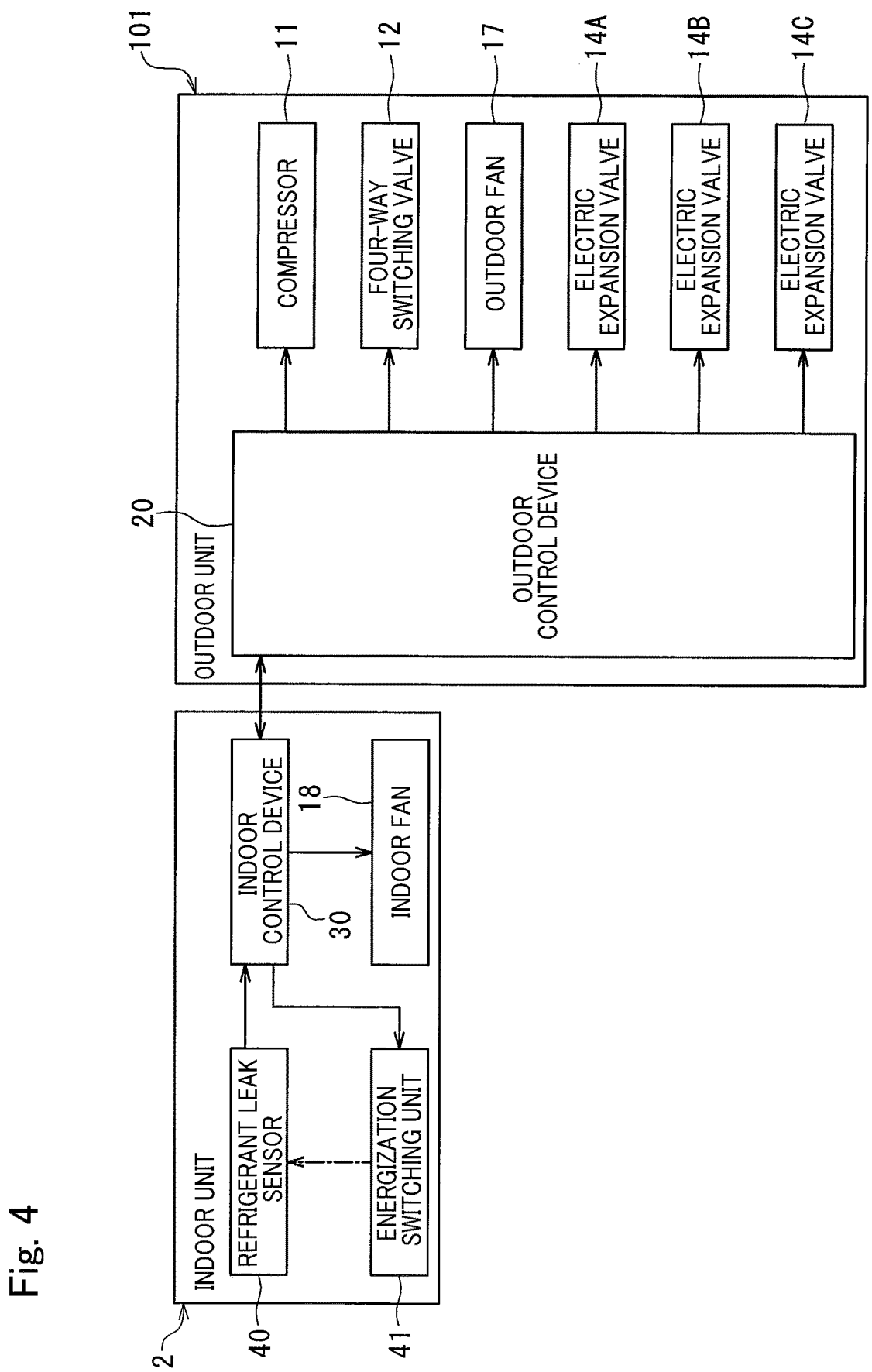
FIG. 4 is a control block diagram of the air conditioning system according to the second connection example.

FIG. 3 is a schematic configuration diagram of an air conditioning system according to the second connection example. FIG. 4 is a control block diagram of the air conditioning system according to the second connection example. The air conditioning system according to the second connection example is similar in configuration to the air conditioning system illustrated in FIGS. 1 and 2 except that an outdoor unit 101 is an outdoor unit adaptable to an air conditioning system of a multi-type. In FIGS. 3 and 4, components similar to the components in FIGS. 1 and 2 are denoted by the same reference signs as FIGS. 1 and 2, and the detailed description of such components will be omitted.

With reference to FIG. 3, in the air conditioning system according to the second connection example, three electric expansion valves 14A, 14B, and 14C are connected to the outdoor heat exchanger 13. Connection pipe connecting parts V1A, V1B, and V1C are connected to the electric expansion valves 14A, 14B, and 14C, respectively. Further, connection pipe connecting parts V2A, V2B, and V2C are connected to the accumulator 16 via the four-way switching valve 12. As illustrated in FIG. 4, the electric expansion valves 14A, 14B, and 14C are each connected to the outdoor control device 20.

The outdoor unit 101 according to the present connection example has three connecting ports. Specifically, the connection pipe connecting part V1A and the connection pipe connecting part V2A constitute one connecting port. Similarly, the connection pipe connecting part V1B and the connection pipe connecting part V2B constitute another connecting port. The connection pipe connecting part V1C and the connection pipe connecting part V2C constitute still another connecting port.

The outdoor unit 101 according to the present connection example has a cooling rated capacity of 5.2 kW. Further, the refrigerant circuit RC according to the present connection example has a maximum filling capacity of 2.2 kg.

In the air conditioning system according to the present connection example, one indoor unit 2 is connected to one outdoor unit 101. The indoor heat exchanger 15 of the indoor unit 2 has one end connected to the connection pipe connecting part VIA via the connection pipe L1, and has the other end connected to the connection pipe connecting part V2A via the connection pipe L2.

Third Connection Example

Figure 5:
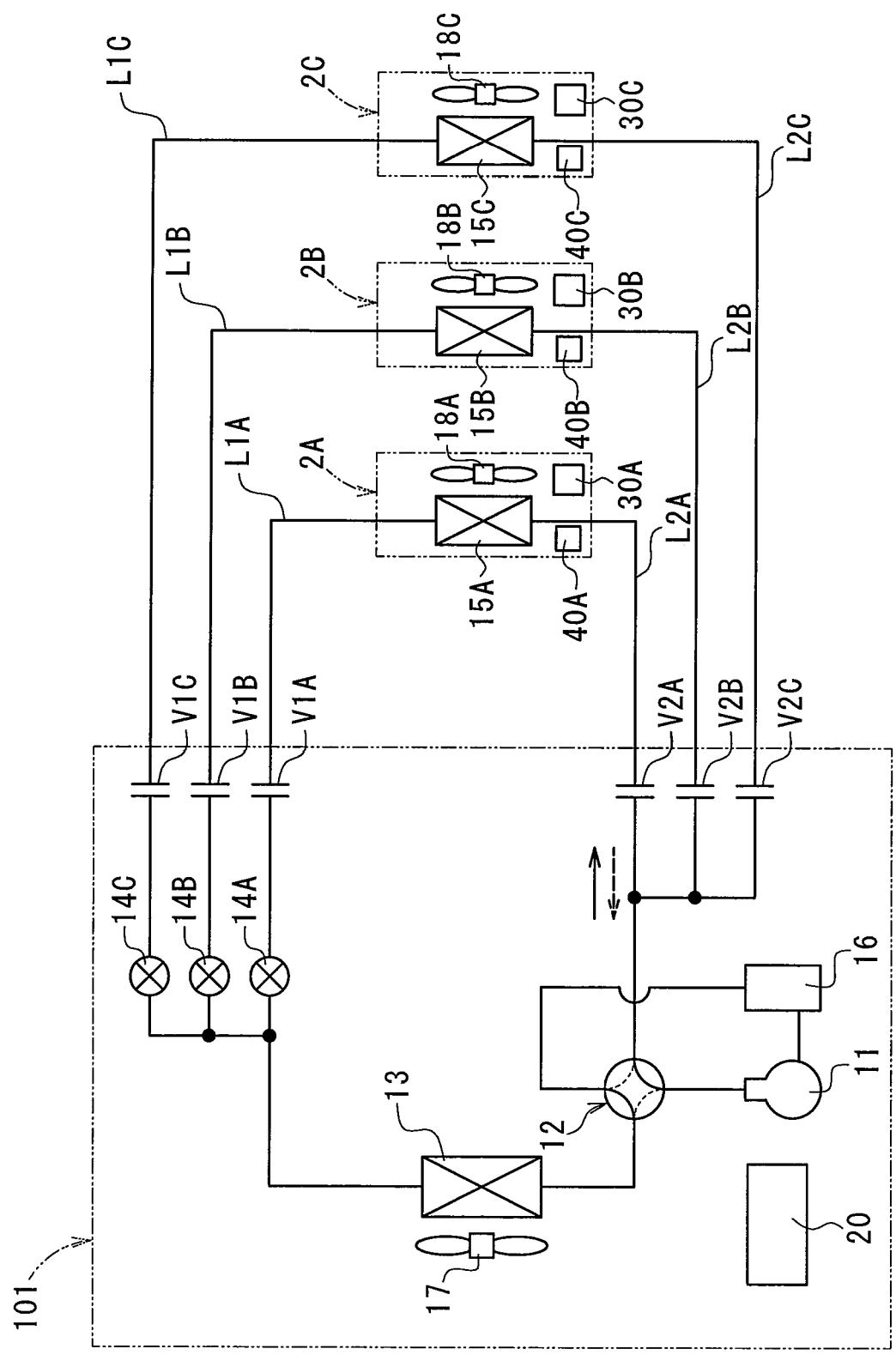
FIG. 5 is a schematic configuration diagram of an air conditioning system according to a third connection example of the first embodiment.
Figure 6:
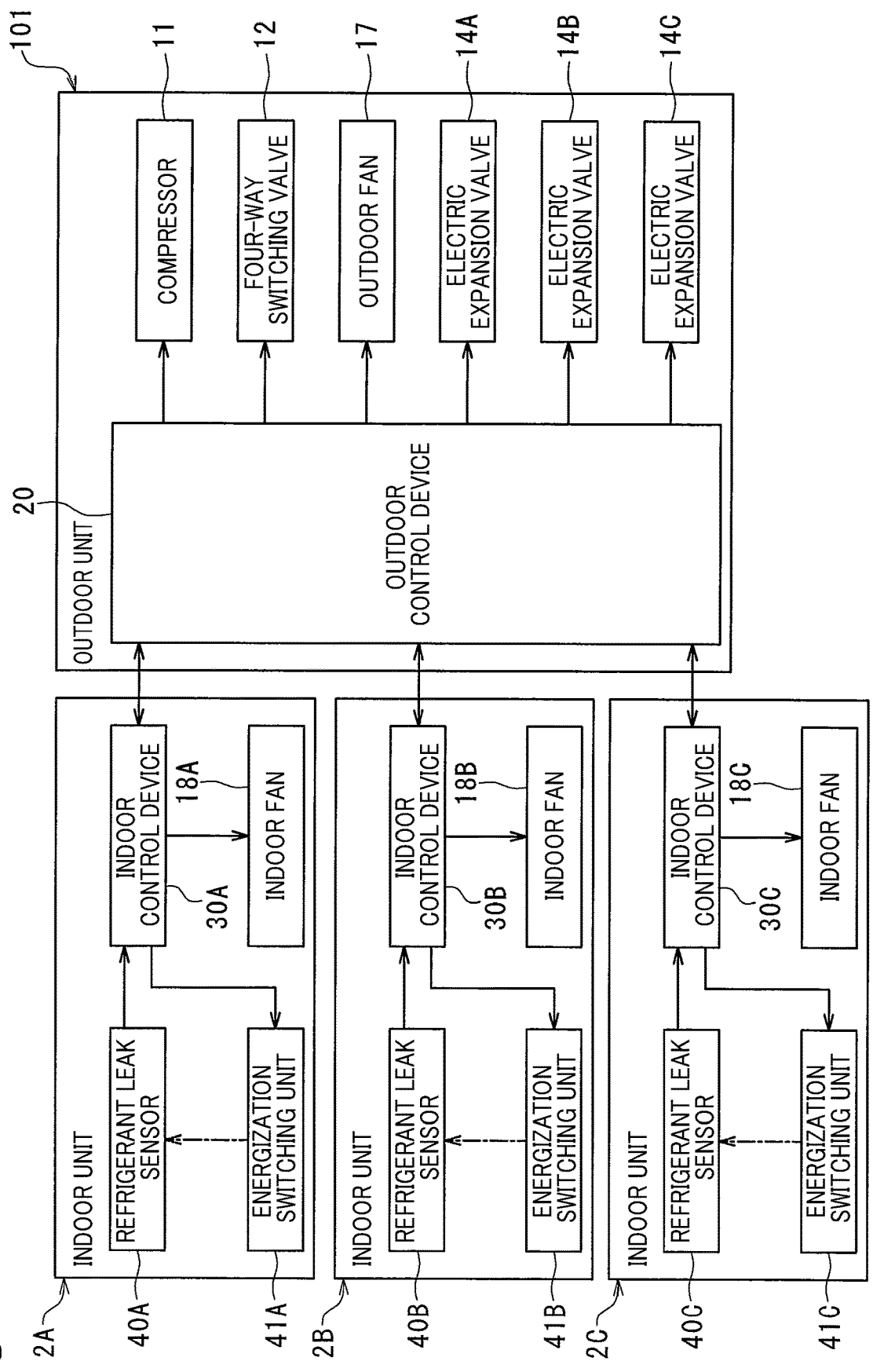
FIG. 6 is a control block diagram of the air conditioning system according to the third connection example.

FIG. 5 is a schematic configuration diagram of an air conditioning system according to the third connection example. FIG. 6 is a control block diagram of the air conditioning system according to the third connection example. The air conditioning system according to the third connection example is similar in configuration to the air conditioning system according to the second connection example except that three indoor units 2A, 2B, and 2C are connected to one outdoor unit 101. In FIGS. 5 and 6, components similar to the components in FIGS. 3 and 4 are denoted by the same reference signs as FIGS. 3 and 4, and the detailed description of such components will be omitted.

The indoor unit 2A is equipped with an indoor heat exchanger 15A and an indoor fan 18A. The indoor unit 2A includes an indoor control device 30A that controls the indoor fan 18A and the like on the basis of a signal from a remote controller (not illustrated) or an indoor temperature sensor (not illustrated). The indoor unit 2A further includes a refrigerant leak sensor 40A that detects leakage of the refrigerant in the indoor unit 2A.

The indoor heat exchanger 15A of the indoor unit 2A has one end connected to the connection pipe connecting part V1A via a connection pipe L1A, and has the other end connected to the connection pipe connecting part V2A via a connection pipe L2A.

The indoor unit 2B is equipped with an indoor heat exchanger 15B and an indoor fan 18B. The indoor unit 2B includes an indoor control device 30B that controls the indoor fan 18B and the like on the basis of a signal from a remote controller (not illustrated) or an indoor temperature sensor (not illustrated). The indoor unit 2B further includes a refrigerant leak sensor 40B that detects leakage of the refrigerant in the indoor unit 2B.

The indoor heat exchanger 15B of the indoor unit 2B has one end connected to the connection pipe connecting part V1B via a connection pipe L1B, and has the other end connected to the connection pipe connecting part V2B via a connection pipe L2B.

The indoor unit 2C is equipped with an indoor heat exchanger 15C and an indoor fan 18C. The indoor unit 2C includes an indoor control device 30C that controls the indoor fan 18C and the like on the basis of a signal from a remote controller (not illustrated) or an indoor temperature sensor (not illustrated). The indoor unit 2C further includes a refrigerant leak sensor 40C that detects leakage of the refrigerant in the indoor unit 2C.

The indoor heat exchanger 15C of the indoor unit 2C has one end connected to the connection pipe connecting part V1C via a connection pipe L1C, and has the other end connected to the connection pipe connecting part V2C via a connection pipe L2C.

With reference to FIG. 6, the indoor control device 30A of the indoor unit 2A, the indoor control device 30B of the indoor unit 2B, and the indoor control device 30C of the indoor unit 2C are connected to the outdoor control device 20.

In the following description, in a case where the indoor units 2A, 2B, and 2C need not be distinguished from one another, the indoor units 2A, 2B, and 2C may be each simply referred to as the indoor unit 2. Similarly, in a case where the indoor control devices 30A, 30B, and 30C need not be distinguished from one another, the indoor control devices 30A, 30B, and 30C may be each simply referred to as the indoor control device 30. Further, in a case where the refrigerant leak sensors 40A, 40B, and 40C need not be distinguished from one another, the refrigerant leak sensors 40A, 40B, and 40C may be each simply referred to as the refrigerant leak sensor 40.

(Energization Control of Refrigerant Leak Sensor)

The refrigerant leak sensor 40 is capable of switching between the energized state and the non-energized state on the basis of information on the refrigerant filling amount by which the refrigerant circuit RC is filled with the refrigerant.

According to the present embodiment, the indoor control device 30 changes the control signal to be output to the energization switching unit 41 on the basis of the information on the refrigerant filling amount by which the refrigerant circuit RC is filled with the refrigerant. Specifically, according to the present embodiment, in the energization control of the refrigerant leak sensor 40, the indoor control device 30 brings the refrigerant leak sensor 40 into the energized state or the non-energized state on the basis of whether the outdoor unit 1 is an outdoor unit adaptable only to an air conditioning system of a pair type or an outdoor unit adaptable to an air conditioning system of a multi-type. Whether the outdoor unit 1 according to the present embodiment is an outdoor unit adaptable only to an air conditioning system of a pair type or an outdoor unit adaptable to an air conditioning system of a multi-type is an example of information on the refrigerant filling amount by which the refrigerant circuit is filled with the refrigerant according to the present disclosure.

Figure 7:
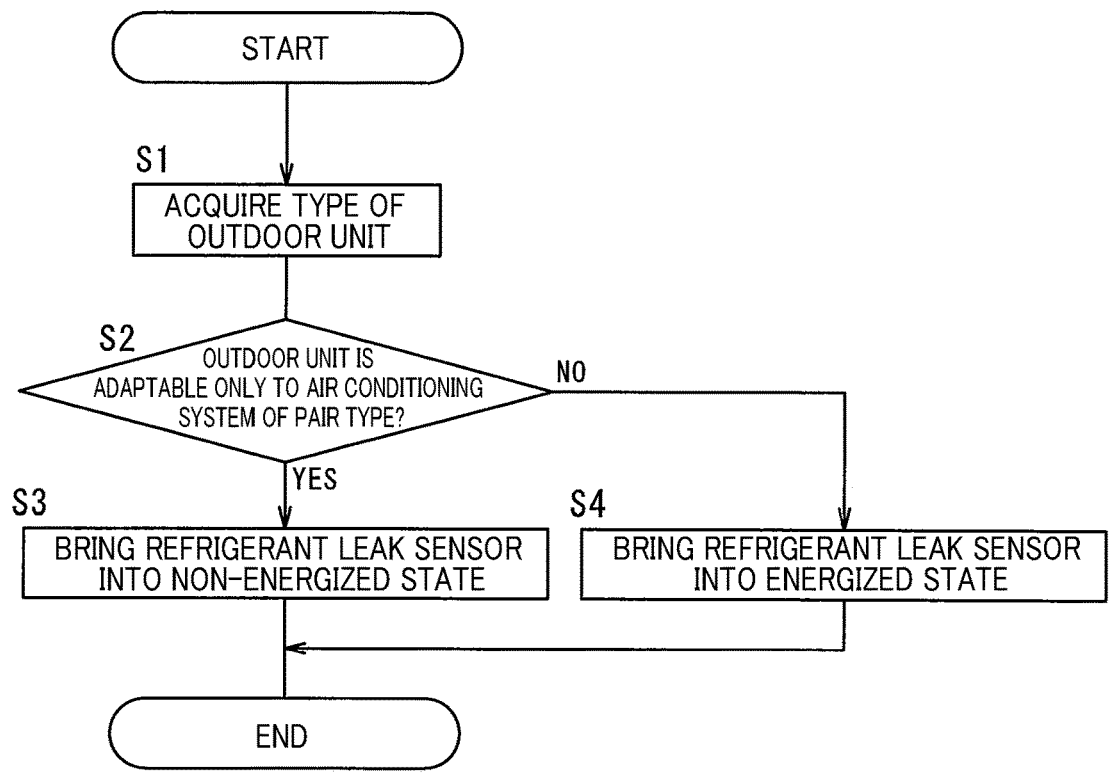
FIG. 7 is a flowchart of energization control according to the first embodiment.

The energization control of the refrigerant leak sensor 40 performed by the indoor control device 30 according to the present embodiment will be described below. FIG. 7 is a flowchart of the energization control of the refrigerant leak sensor 40 performed by the indoor control device 30. In the following description, in a case where the outdoor unit 1 illustrated in FIGS. 1 and 2 and the outdoor unit 101 illustrated in FIGS. 3 to 6 need not be distinguished from one another, the outdoor units 1, 101 may be each simply referred to as the outdoor unit 1.

With reference to FIG. 7, when the outdoor unit 1 and the indoor unit 2 are powered on, the energization control of the refrigerant leak sensor 40 is started.

First, the indoor control device 30 communicates with the outdoor control device 20 to acquire the type of the outdoor unit 1 (step S1). Here, the type of the outdoor unit 1 corresponds to either an outdoor unit adaptable only to an air conditioning system of a pair type or an outdoor unit adaptable to an air conditioning system of a multi-type.

Next, the indoor control device 30 determines whether the outdoor unit 1 is adaptable only to an air conditioning system of a pair type (step S2).

In a case where it is determined in step S2 that the outdoor unit 1 is an outdoor unit adaptable only to an air conditioning system of a pair type, the indoor control device 30 outputs, to the energization switching unit 41, a control signal for bringing the refrigerant leak sensor 40 into the non-energized state. Upon receipt of the above-described control signal, the energization switching unit 41 interrupts power supply to the refrigerant leak sensor 40 to bring the refrigerant leak sensor 40 into the non-energized state (step S3).

On the other hand, in a case where it is determined in step S2 that the outdoor unit 1 is an outdoor unit adaptable to an air conditioning system of a multi-type, the indoor control device 30 outputs, to the energization switching unit 41, a control signal for bringing the refrigerant leak sensor 40 into the energized state. Upon receipt of the above-described control signal, the energization switching unit 41 supplies power to the refrigerant leak sensor 40 to bring the refrigerant leak sensor 40 into the energized state (step S4).

After bringing the refrigerant leak sensor 40 into the energized state or the non-energized state, the indoor control device 30 terminates the energization control of the refrigerant leak sensor 40.

According to the present embodiment, after being brought into the non-energized state under the energization control performed by the indoor control device 30, the refrigerant leak sensor 40 can be switched to the energized state. For example, in a case where a user allows the refrigerant leak sensor 40 to consume power, the user may operate a remote controller to switch the refrigerant leak sensor 40 to the energized state. On the other hand, after being brought into the energized state under the energization control performed by the indoor control device 30, the refrigerant leak sensor 40 cannot be switched to the non-energized state by the operation made by the user.

In the air conditioning system illustrated in FIGS. 1 and 2, the outdoor unit 1 is an outdoor unit adaptable only to an air conditioning system of a pair type to which one indoor unit 2 can be connected. That is, in the above-described air conditioning system, the refrigerant leak sensor 40 of the indoor unit 2 is brought into the non-energized state under the energization control of the refrigerant leak sensor 40.

In the air conditioning system illustrated in FIGS. 3 and 4, the outdoor unit 101 is an outdoor unit adaptable to an air conditioning system of a multi-type to which a plurality of indoor units 2 can be connected. That is, in the above-described air conditioning system, the refrigerant leak sensor 40 of the indoor unit 2 is brought into the energized state under the energization control of the refrigerant leak sensor 40.

In the air conditioning system illustrated in FIGS. 5 and 6, the outdoor unit 101 is an outdoor unit adaptable to an air conditioning system of a multi-type to which the plurality of indoor units 2A, 2B, and 2C can be connected. That is, in the above-described air conditioning system, the refrigerant leak sensors 40A, 40B, and 40C of the indoor units 2A, 2B, and 2C are brought into the energized state under the energization control of the refrigerant leak sensors 40A, 40B, and 40C. Here, the energization control of the refrigerant leak sensors 40A, 40B, and 40C is performed separately for each of the indoor units 2A, 2B, and 2C.

The air conditioning system according to the present embodiment produces the following operational effects.

The refrigerant leak sensor 40 can be switched between the energized state and the non-energized state on the basis of information on the refrigerant filling amount by which the refrigerant circuit RC is filled with the refrigerant. According to the present embodiment, in a case where the refrigerant filling amount is small, and a risk associated with leakage of the refrigerant is low, the refrigerant leak sensor 40 is brought into the non-energized state, so that it is possible to minimize power consumed by the refrigerant leak sensor 40 in the air conditioning system in which the refrigerant filling amount is small.

In general, the larger the number of indoor units connectable to the outdoor unit, the larger the refrigerant filling amount by which the refrigerant circuit is filled with the refrigerant. According to the present embodiment, when the outdoor unit 1 is an outdoor unit adaptable only to an air conditioning system of a pair type, the refrigerant leak sensor is brought into the non-energized state. On the other hand, when the outdoor unit 1 is an outdoor unit adaptable to an air conditioning system of a multi-type, the refrigerant leak sensor 40 is brought into the energized state. This makes it possible to minimize power consumed by the refrigerant leak sensor 40 in an air conditioning system in which the refrigerant filling amount is small, and the risk associated with leakage of the refrigerant is small.

If the energization control of the refrigerant leak sensor is performed on the basis of an operating state (for example, the rotational speed of the indoor fan) of the air conditioning system while the air conditioning system is in operation, it is necessary to monitor the operating state and perform the energization control of the refrigerant leak sensor every time the operating state changes, which makes the control complicated. On the other hand, according to the present embodiment, the indoor control device 30 performs the energization control of the refrigerant leak sensor 40 when the outdoor unit 1 and the indoor unit 2 are powered on. This eliminates the need for performing the energization control of the refrigerant leak sensor 40 while the air conditioning system is in operation, so that it is possible to make the energization control of the refrigerant leak sensor 40 performed by the indoor control device 30 simpler.

Second Embodiment

An air conditioning system according to a second embodiment is similar in configuration to the air conditioning system according to the first embodiment except for the energization control of the refrigerant leak sensor 40, and will be therefore described with reference to FIGS. 1 to 6.

The refrigerant leak sensor 40 is capable of switching between the energized state and the non-energized state on the basis of information on the refrigerant filling amount by which the refrigerant circuit RC is filled with the refrigerant. According to the present embodiment, the indoor control device 30 changes the control signal to be output to the energization switching unit 41 on the basis of the information on the refrigerant filling amount by which the refrigerant circuit RC is filled with the refrigerant. Specifically, according to the present embodiment, the indoor control device 30 brings the refrigerant leak sensor 40 into the energized state or the non-energized state on the basis of the number N of indoor units 2 connected to the outdoor unit 1 in the energization control of the refrigerant leak sensor 40. The number N of indoor units 2 connected to the outdoor unit 1 according to the present embodiment is an example of information on the refrigerant filling amount by which the refrigerant circuit is filled with the refrigerant according to the present disclosure.

Figure 8:
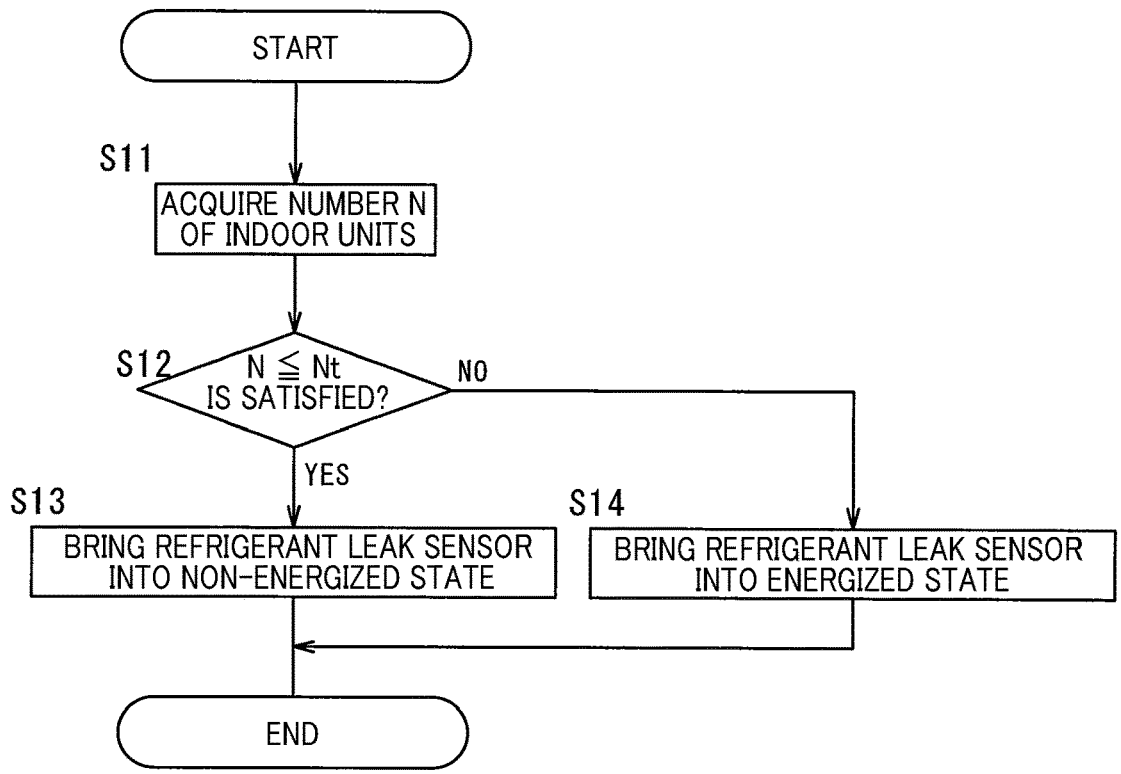
FIG. 8 is a flowchart of energization control according to a second embodiment.

The energization control of the refrigerant leak sensor 40 performed by the indoor control device 30 according to the present embodiment will be described below. FIG. 8 is a flowchart of the energization control of the refrigerant leak sensor 40 performed by the indoor control device 30. In the following description, in a case where the outdoor unit 1 illustrated in FIGS. 1 and 2 and the outdoor unit 101 illustrated in FIGS. 3 to 6 need not be distinguished from one another, the outdoor units 1, 101 may be each simply referred to as the outdoor unit 1.

With reference to FIG. 8, when the outdoor unit 1 and the indoor unit 2 are powered on, the energization control of the refrigerant leak sensor 40 is started.

First, the indoor control device 30 communicates with the outdoor control device 20 to acquire the number N of indoor units 2 connected to the outdoor unit 1 (step S11). The number N of indoor units 2 connected to the outdoor unit 1 is an integer greater than or equal to 1.

Next, the indoor control device 30 determines a magnitude relation between the number N of indoor units 2 connected to the outdoor unit 1 and a predetermined threshold Nt (step S12). The threshold Nt is an integer greater than or equal to 1. According to the present embodiment, Nt=1.

In a case where it is determined in step S12 that N≤Nt is satisfied, the indoor control device 30 outputs, to the energization switching unit 41, a control signal for bringing the refrigerant leak sensor 40 into the non-energized state. Upon receipt of the control signal, the energization switching unit 41 interrupts power supply to the refrigerant leak sensor 40 to bring the refrigerant leak sensor 40 into the non-energized state (step S13).

On the other hand, in a case where it is determined in step S12 that N>Nt is satisfied, the indoor control device 30 outputs, to the energization switching unit 41, a control signal for bringing the refrigerant leak sensor 40 into the energized state. Upon receipt of the above-described control signal, the energization switching unit 41 supplies power to the refrigerant leak sensor 40 to bring the refrigerant leak sensor 40 into the energized state (step S14).

After bringing the refrigerant leak sensor 40 into the energized state or the non-energized state, the indoor control device 30 terminates the energization control of the refrigerant leak sensor 40.

According to the present embodiment, after being brought into the non-energized state under the energization control performed by the indoor control device 30, the refrigerant leak sensor 40 can be switched to the energized state. For example, in a case where a user allows the refrigerant leak sensor 40 to consume power, the user may operate a remote controller to switch the refrigerant leak sensor 40 to the energized state. On the other hand, after being brought into the energized state under the energization control performed by the indoor control device 30, the refrigerant leak sensor 40 cannot be switched to the non-energized state by the operation made by the user.

In the air conditioning system illustrated in FIGS. 1 and 2, one indoor unit 2 is connected to the outdoor unit 1 (N=1). That is, since N≤Nt is satisfied in the above-described air conditioning system, the refrigerant leak sensor 40 of the indoor unit 2 is brought into the non-energized state under the energization control of the refrigerant leak sensor 40.

In the air conditioning system illustrated in FIGS. 3 and 4, one indoor unit 2 is connected to the outdoor unit 101 (N=1). That is, since N≤Nt is satisfied in the above-described air conditioning system, the refrigerant leak sensor 40 of the indoor unit 2 is brought into the non-energized state under the energization control of the refrigerant leak sensor 40.

In the air conditioning system illustrated in FIGS. 5 and 6, the three indoor units 2A, 2B, and 2C are connected to the outdoor unit 101 (N=3). That is, since N>Nt is satisfied in the above-described air conditioning system, the refrigerant leak sensors 40A, 40B, and 40C of the indoor units 2A, 2B, and 2C are brought into the energized state under the energization control of the refrigerant leak sensors 40A, 40B, and 40C. Here, the energization control of the refrigerant leak sensors 40A, 40B, and 40C is performed separately for each of the indoor units 2A, 2B, and 2C.

The air conditioning system according to the present embodiment produces the following operational effects.

The refrigerant leak sensor 40 can be switched between the energized state and the non-energized state on the basis of information on the refrigerant filling amount by which the refrigerant circuit RC is filled with the refrigerant. According to the present embodiment, in a case where the refrigerant filling amount is small, and a risk associated with leakage of the refrigerant is low, the refrigerant leak sensor 40 is brought into the non-energized state, so that it is possible to minimize power consumed by the refrigerant leak sensor 40 in the air conditioning system in which the refrigerant filling amount is small.

In general, the larger the number of indoor units connected to the outdoor unit, the larger the refrigerant filling amount by which the refrigerant circuit is filled with the refrigerant. According to the present embodiment, the refrigerant leak sensor is brought into the energized state when at least two indoor units 2 are connected to the outdoor unit 1, and the refrigerant leak sensor 40 is brought into the non-energized state when one indoor unit 2 is connected to the outdoor unit 1. This makes it possible to minimize power consumed by the refrigerant leak sensor 40 in an air conditioning system in which the refrigerant filling amount is small, and the risk associated with leakage of the refrigerant is small.

If the energization control of the refrigerant leak sensor is performed on the basis of an operating state (for example, the rotational speed of the indoor fan) of the air conditioning system while the air conditioning system is in operation, it is necessary to monitor the operating state and perform the energization control of the refrigerant leak sensor every time the operating state changes, which makes the control complicated. On the other hand, according to the present embodiment, the indoor control device 30 performs the energization control of the refrigerant leak sensor 40 when the outdoor unit 1 and the indoor unit 2 are powered on. This eliminates the need for performing the energization control of the refrigerant leak sensor 40 while the air conditioning system is in operation, so that it is possible to make the energization control of the refrigerant leak sensor 40 performed by the indoor control device 30 simpler.

According to the present embodiment, Nt=1, but the present disclosure is not limited to such an embodiment, and the threshold Nt may be greater than or equal to 2, for example.

Third Embodiment

An air conditioning system according to a third embodiment is similar in configuration to the air conditioning system according to the first embodiment except for the energization control of the refrigerant leak sensor 40, and will be therefore described with reference to FIGS. 1 to 6. According to the present embodiment, the indoor control device 30 brings the refrigerant leak sensor 40 into the energized state or the non-energized state on the basis of the number M of connecting ports provided in the outdoor unit 1 in the energization control of the refrigerant leak sensor 40. The number M of connecting ports provided in the outdoor unit 1 according to the present embodiment is an example of information on the refrigerant filling amount by which the refrigerant circuit is filled with the refrigerant according to the present disclosure.

Figure 9:
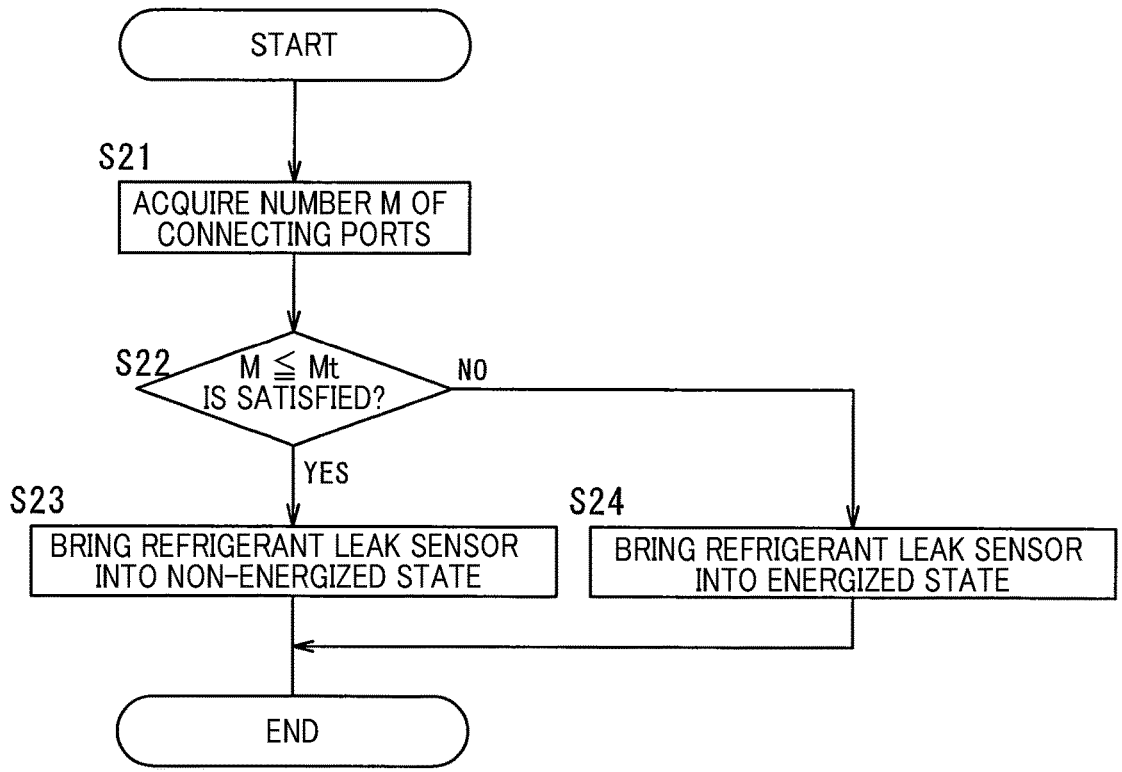
FIG. 9 is a flowchart of energization control according to a third embodiment.

The energization control of the refrigerant leak sensor 40 performed by the indoor control device 30 according to the present embodiment will be described below. FIG. 9 is a flowchart of the energization control of the refrigerant leak sensor 40 performed by the indoor control device 30 according to the present embodiment. In the following description, in a case where the outdoor unit 1 illustrated in FIGS. 1 and 2 and the outdoor unit 101 illustrated in FIGS. 3 to 6 need not be distinguished from one another, the outdoor units 1, 101 may be each simply referred to as the outdoor unit 1.

With reference to FIG. 9, when the outdoor unit 1 and the indoor unit 2 are powered on, the energization control of the refrigerant leak sensor 40 is started.

First, the indoor control device 30 communicates with the outdoor control device 20 to acquire the number M of connecting ports provided in the outdoor unit 1 (step S21). M is an integer greater than or equal to 1.

Next, the indoor control device 30 determines a magnitude relation between the number M of connecting ports provided in the outdoor unit 1 and a predetermined threshold Mt (step S22). The threshold Mt is an integer greater than or equal to 1. According to the present embodiment, Mt=1. That is, in step S22, the indoor control device 30 according to the present embodiment determines whether the outdoor unit 1 is adaptable only to an air conditioning system of a pair type (M=1) or an air conditioning system of a multi-type (M≥2).

In a case where it is determined in step S22 that M≤Mt is satisfied, that is, the outdoor unit 1 is adaptable only to an air conditioning system of a pair type, the indoor control device 30 outputs, to the energization switching unit 41, a control signal for bringing the refrigerant leak sensor 40 into the non-energized state. Upon receipt of the control signal, the energization switching unit 41 interrupts power supply to the refrigerant leak sensor 40 to bring the refrigerant leak sensor 40 into the non-energized state (step S23).

On the other hand, in a case where it is determined in step S22 that M>Mt is satisfied, that is, the outdoor unit 1 is adaptable to an air conditioning system of a multi-type, the indoor control device 30 outputs, to the energization switching unit 41, a control signal for bringing the refrigerant leak sensor 40 into the energized state. Upon receipt of the above-described control signal, the energization switching unit 41 supplies power to the refrigerant leak sensor 40 to bring the refrigerant leak sensor 40 into the energized state (step S24).

After bringing the refrigerant leak sensor 40 into the energized state or the non-energized state, the indoor control device 30 terminates the energization control of the refrigerant leak sensor 40.

According to the present embodiment, after being brought into the non-energized state under the energization control performed by the indoor control device 30, the refrigerant leak sensor 40 can be switched to the energized state. For example, in a case where a user allows the refrigerant leak sensor 40 to consume power, the user may operate a remote controller to switch the refrigerant leak sensor 40 to the energized state. On the other hand, after being brought into the energized state under the energization control performed by the indoor control device 30, the refrigerant leak sensor 40 cannot be switched to the non-energized state by the operation made by the user.

In the air conditioning system illustrated in FIGS. 1 and 2, one connecting port is provided in the outdoor unit 1 (M=1). That is, since M≤Mt is satisfied in the above-described air conditioning system, the refrigerant leak sensor 40 of the indoor unit 2 is brought into the non-energized state under the energization control of the refrigerant leak sensor 40.

In the air conditioning system illustrated in FIGS. 3 and 4, three connecting ports are provided in the outdoor unit 101 (M=3). That is, since M>Mt is satisfied in the above-described air conditioning system, the refrigerant leak sensor 40 of the indoor unit 2 is brought into the energized state under the energization control of the refrigerant leak sensor 40.

In the air conditioning system illustrated in FIGS. 5 and 6, three connecting ports are provided in the outdoor unit 101 (M=3). That is, since M>Mt is satisfied in the above-described air conditioning system, the refrigerant leak sensors 40A, 40B, and 40C of the indoor units 2A, 2B, and 2C are brought into the energized state under the energization control of the refrigerant leak sensor 40. The energization control of the refrigerant leak sensors 40A, 40B, and 40C is performed separately for each of the indoor units 2A, 2B, and 2C.

The air conditioning system according to the third embodiment produces operational effects similar to the operational effects produced by the air conditioning system according to the first embodiment.

In general, the larger the number of indoor units connectable to the outdoor unit, the larger the refrigerant filling amount. Further, the number of indoor units connectable to the outdoor unit corresponds to the number of connecting ports of the outdoor unit. According to the present embodiment, the refrigerant leak sensor 40 is brought into the energized state when at least two connecting ports are provided in the outdoor unit 1, and the refrigerant leak sensor 40 is brought into the non-energized state when one connecting port is provided in the outdoor unit 1. This makes it possible to minimize power consumed by the refrigerant leak sensor 40 in an air conditioning system in which the refrigerant filling amount is small, and the risk associated with leakage of the refrigerant is small.

Fourth Embodiment

An air conditioning system according to a fourth embodiment is similar in configuration to the air conditioning system according to the first embodiment except for the energization control of the refrigerant leak sensor 40, and will be therefore described with reference to FIGS. 1 to 6. According to the present embodiment, the indoor control device 30 brings the refrigerant leak sensor 40 into the energized state or the non-energized state on the basis of the rated capacity W of the outdoor unit 1 in the energization control of the refrigerant leak sensor 40. The rated capacity W of the outdoor unit 1 according to the present embodiment is an example of information on the refrigerant filling amount by which the refrigerant circuit is filled with the refrigerant according to the present disclosure.

Figure 10:
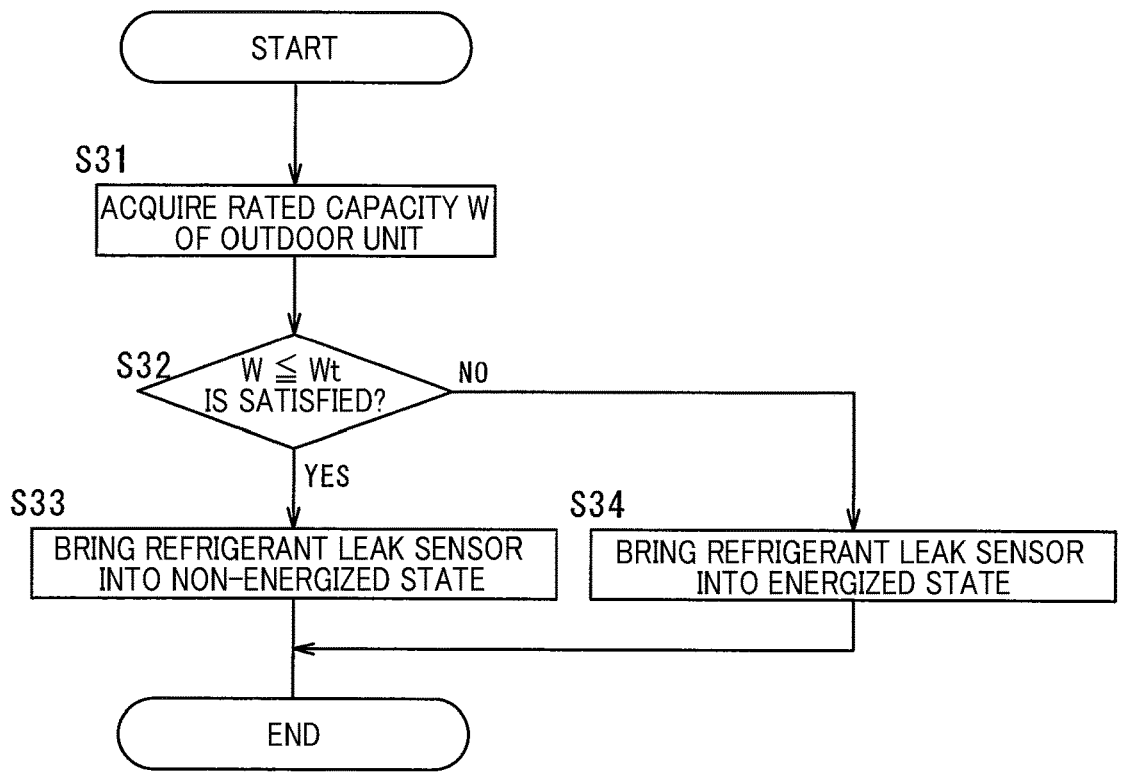
FIG. 10 is a flowchart of energization control according to a fourth embodiment.

The energization control of the refrigerant leak sensor 40 will be described below. FIG. 10 is a flowchart of the energization control of the refrigerant leak sensor 40 performed by the indoor control device 30 according to the present embodiment. In the following description, in a case where the outdoor unit 1 illustrated in FIGS. 1 and 2 and the outdoor unit 101 illustrated in FIGS. 3 to 6 need not be distinguished from one another, the outdoor units 1, 101 may be each simply referred to as the outdoor unit 1.

With reference to FIG. 10, when the outdoor unit 1 and the indoor unit 2 are powered on, the energization control of the refrigerant leak sensor 40 is started.

First, the indoor control device 30 communicates with the outdoor control device 20 to acquire the rated capacity W [kW] of the outdoor unit 1 (step S31).

Next, the indoor control device 30 determines a magnitude relation between W and a predetermined threshold Wt (step S32). According to the present embodiment, Wt=5.0 [kW].

In a case where it is determined in step S32 that W≤Wt is satisfied, the indoor control device 30 outputs, to the energization switching unit 41, a control signal for bringing the refrigerant leak sensor 40 into the non-energized state. Upon receipt of the control signal, the energization switching unit 41 interrupts power supply to the refrigerant leak sensor 40 to bring the refrigerant leak sensor 40 into the non-energized state (step S33).

On the other hand, in a case where it is determined in step S32 that W>Wt is satisfied, the indoor control device 30 outputs, to the energization switching unit 41, a control signal for bringing the refrigerant leak sensor 40 into the energized state. Upon receipt of the above-described control signal, the energization switching unit 41 supplies power to the refrigerant leak sensor 40 to bring the refrigerant leak sensor 40 into the energized state (step S34).

After bringing the refrigerant leak sensor 40 into the energized state or the non-energized state, the indoor control device 30 terminates the energization control of the refrigerant leak sensor 40.

According to the present embodiment, after being brought into the non-energized state under the energization control performed by the indoor control device 30, the refrigerant leak sensor 40 can be switched to the energized state. For example, in a case where a user allows the refrigerant leak sensor 40 to consume power, the user may operate a remote controller to switch the refrigerant leak sensor 40 to the energized state. On the other hand, after being brought into the energized state under the energization control performed by the indoor control device 30, the refrigerant leak sensor 40 cannot be switched to the non-energized state by the operation made by the user.

In the air conditioning system illustrated in FIGS. 1 and 2, the outdoor unit 1 has a cooling rated capacity of 5.0 kW (W=5.0). That is, since W≤Wt is satisfied in the above-described air conditioning system, the refrigerant leak sensor 40 of the indoor unit 2 is brought into the non-energized state under the energization control of the refrigerant leak sensor 40.

In the air conditioning system illustrated in FIGS. 3 and 4, the outdoor unit 101 has a cooling rated capacity of 5.2 kW (W=5.2). That is, since W>Wt is satisfied in the above-described air conditioning system, the refrigerant leak sensor 40 of the indoor unit 2 is brought into the energized state under the energization control of the refrigerant leak sensor 40.

In the air conditioning system illustrated in FIGS. 5 and 6, the outdoor unit 101 has a cooling rated capacity of 5.2 kW (W=5.2). That is, since W>Wt is satisfied in the above-described air conditioning system, the refrigerant leak sensors 40A, 40B, and 40C of the indoor units 2A, 2B, and 2C are brought into the energized state under the energization control of the refrigerant leak sensor 40. The energization control of the refrigerant leak sensors 40A, 40B, and 40C is performed separately for each of the indoor units 2A, 2B, and 2C.

The air conditioning system according to the fourth embodiment produces operational effects similar to the operational effects produced by the air conditioning system according to the first embodiment.

In general, the higher the rated capacity of the outdoor unit, the larger the refrigerant filling amount. According to the present embodiment, the refrigerant leak sensor 40 is brought into the energized state when the rated capacity of the outdoor unit 1 exceeds the predetermined threshold Wt, and the refrigerant leak sensor 40 is brought into the non-energized state when the rated capacity of the outdoor unit 1 is less than or equal to the predetermined threshold Wt. This makes it possible to minimize power consumed by the refrigerant leak sensor 40 in an air conditioning system in which the refrigerant filling amount is small, and the risk associated with leakage of the refrigerant is small.

Fifth Embodiment

An air conditioning system according to a fifth embodiment is similar in configuration to the air conditioning system according to the first embodiment except for the energization control of the refrigerant leak sensor 40, and will be therefore described with reference to FIGS. 1 to 6.

According to the present embodiment, the indoor control device 30 brings the refrigerant leak sensor 40 into the energized state or the non-energized state on the basis of the maximum filling capacity Cmax up to which the refrigerant circuit RC is allowed to be filled with the refrigerant in the energization control of the refrigerant leak sensor 40. The maximum filling capacity Cmax up to which the refrigerant circuit RC according to the present embodiment is allowed to be filled with the refrigerant is an example of information on the refrigerant filling amount by which the refrigerant circuit is filled with the refrigerant according to the present disclosure.

Figure 11:
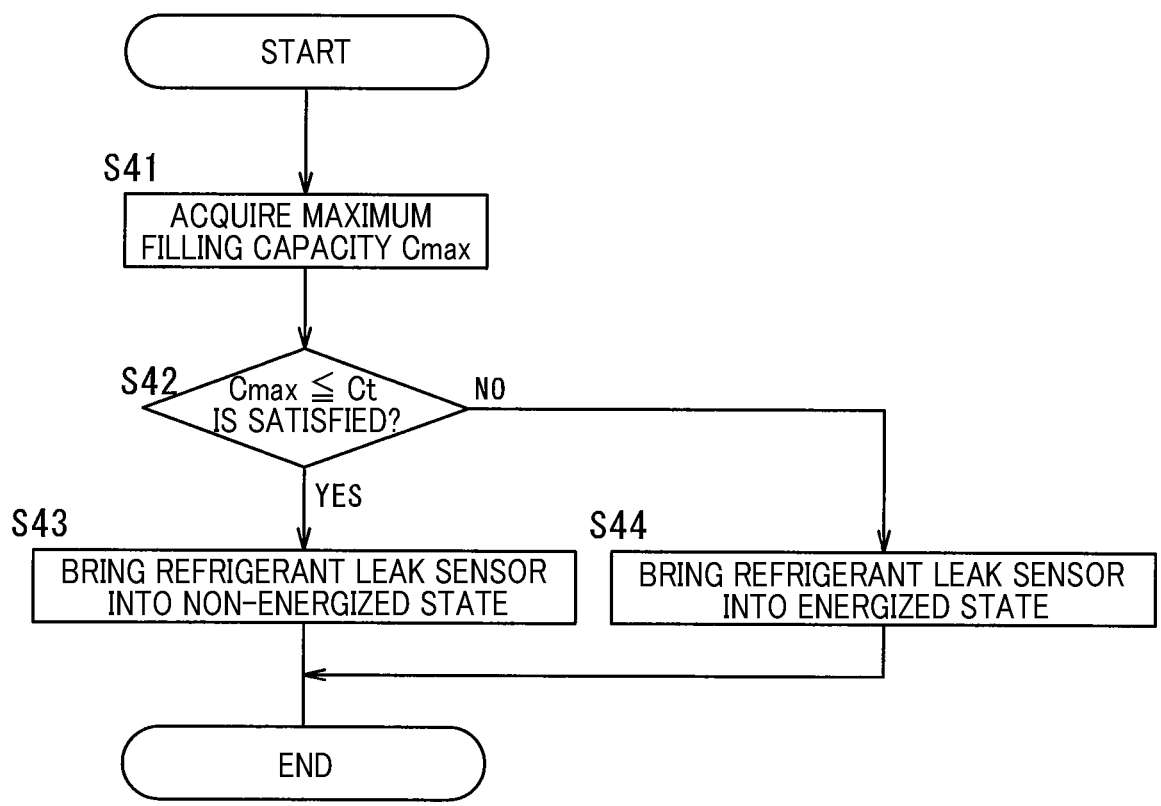
FIG. 11 is a flowchart of energization control according to a fifth embodiment.

The energization control of the refrigerant leak sensor 40 will be described below. FIG. 11 is a flowchart of the energization control of the refrigerant leak sensor 40 performed by the indoor control device 30 according to the present embodiment. In the following description, in a case where the outdoor unit 1 illustrated in FIGS. 1 and 2 and the outdoor unit 101 illustrated in FIGS. 3 to 6 need not be distinguished from one another, the outdoor units 1, 101 may be each simply referred to as the outdoor unit 1.

With reference to FIG. 11, when the outdoor unit 1 and the indoor unit 2 are powered on, the energization control of the refrigerant leak sensor 40 is started.

First, the indoor control device 30 communicates with the outdoor control device 20 to acquire the maximum filling capacity Cmax [kg] up to which the refrigerant circuit RC is allowed to be filled with the refrigerant (step S41). The maximum filling capacity Cmax is determined by the outdoor control device 20 on the basis of Cmax=C1+(La−Lb)*c. Here, C1 represents a standard refrigerant filling amount [kg]. The standard refrigerant filling amount C1 is, for example, a refrigerant filling amount at the time of shipment of the outdoor unit 1. In this case, the standard refrigerant filling amount C1 is displayed on a rating plate (not illustrated) attached to the outdoor unit 1. Further, La represents a maximum pipe length [m] of a connection pipe constituting the refrigerant circuit RC, and Lb represents a chargeless pipe length [m] of a connection pipe that need not be additionally filled with the refrigerant. c represents an additional refrigerant filling amount [kg] per meter of the connection pipe.

Next, the indoor control device 30 determines a magnitude relation between Cmax and a predetermined threshold Ct (step S42). According to the present embodiment, Ct=1.8 [kg].

In a case where it is determined in step S42 that Cmax≤Ct is satisfied, the indoor control device 30 outputs, to the energization switching unit 41, a control signal for bringing the refrigerant leak sensor 40 into the non-energized state. Upon receipt of the control signal, the energization switching unit 41 interrupts power supply to the refrigerant leak sensor 40 to bring the refrigerant leak sensor 40 into the non-energized state (step S43).

On the other hand, in a case where it is determined in step S42 that Cmax>Ct is satisfied, the indoor control device 30 outputs, to the energization switching unit 41, a control signal for bringing the refrigerant leak sensor 40 into the energized state. Upon receipt of the above-described control signal, the energization switching unit 41 supplies power to the refrigerant leak sensor 40 to bring the refrigerant leak sensor 40 into the energized state (step S44).

After bringing the refrigerant leak sensor 40 into the energized state or the non-energized state, the indoor control device 30 terminates the energization control of the refrigerant leak sensor 40.

According to the present embodiment, after being brought into the non-energized state under the energization control performed by the indoor control device 30, the refrigerant leak sensor 40 can be switched to the energized state. For example, in a case where a user allows the refrigerant leak sensor 40 to consume power, the user may operate a remote controller to switch the refrigerant leak sensor 40 to the energized state. On the other hand, after being brought into the energized state under the energization control performed by the indoor control device 30, the refrigerant leak sensor 40 cannot be switched to the non-energized state by the operation made by the user.

In the air conditioning system illustrated in FIGS. 1 and 2, the maximum filling capacity Cmax of the refrigerant circuit RC is 1.5 kg (Cmax=1.5). That is, since Cmax≤Ct is satisfied in the above-described air conditioning system, the refrigerant leak sensor 40 of the indoor unit 2 is brought into the non-energized state under the energization control of the refrigerant leak sensor 40.

In the air conditioning system illustrated in FIGS. 3 and 4, the maximum filling capacity Cmax of the refrigerant circuit RC is 2.2 kg (Cmax=2.2). That is, since Cmax>Ct is satisfied in the above-described air conditioning system, the refrigerant leak sensor 40 of the indoor unit 2 is brought into the energized state under the energization control of the refrigerant leak sensor 40.

In the air conditioning system illustrated in FIGS. 5 and 6, the maximum filling capacity Cmax of the refrigerant circuit RC is 2.2 kg (Cmax=2.2). That is, since Cmax>Ct is satisfied in the above-described air conditioning system, the refrigerant leak sensors 40A, 40B, and 40C of the indoor units 2A, 2B, and 2C are brought into the energized state under the energization control of the refrigerant leak sensor 40. The energization control of the refrigerant leak sensors 40A, 40B, and 40C is performed separately for each of the indoor units 2A, 2B, and 2C.

The air conditioning system according to the fifth embodiment produces operational effects similar to the operational effects produced by the air conditioning system according to the first embodiment.

Although the embodiments have been described above, it will be understood that various changes in form and details can be made without departing from the spirit and scope of the claims.

For example, the above-described first to fifth embodiments may be combined.

EXPLANATION OF REFERENCES

1 Outdoor unit
2, 2A, 2B, 2C Indoor unit
11 Compressor
12 Four-way switching valve
13 Outdoor heat exchanger
14, 14A, 14B, 14C Electric expansion valve
15, 15A, 15B, 15C Indoor heat exchanger
16 Accumulator
17 Outdoor fan
18, 18A, 18B, 18C Indoor fan
20 Outdoor control device
30, 30A, 30B, 30C Indoor control device
40, 40A, 40B, 40C Refrigerant leak sensor (detection unit)
41, 41A, 41B, 41C Energization switching unit
101 Outdoor unit
RC Refrigerant circuit
L1, L1A, L1B, L1C Connection pipe
L2, L2A, L2B, L2C Connection pipe
V1, V1A, V1B, V1C Connection pipe connecting part
V2, V2A, V2B, V2C Connection pipe connecting part

What is claimed is:

1. An air conditioning system comprising:
   a refrigerant circuit including an indoor heat exchanger of an indoor unit and an outdoor heat exchanger of an outdoor unit; and
   a detector configured to detect a refrigerant leaking from the indoor unit,
   wherein the detector is configured to switch between an energized state and a non-energized state on a basis of information on a refrigerant filling amount by which the refrigerant circuit is filled with the refrigerant.

2. The air conditioning system according to claim 1, wherein the information on the refrigerant filling amount includes whether the outdoor unit is an outdoor unit connected to the indoor unit on a one-to-one basis and adaptable to an air conditioning system of a pair type or an outdoor unit connected to a plurality of indoor units and adaptable to an air conditioning system of a multi-type.

3. The air conditioning system according to claim 1, wherein the information on the refrigerant filling amount includes a number of indoor units connected to the outdoor unit.

4. The air conditioning system according to claim 1, wherein the information on the refrigerant filling amount includes a number of connecting ports provided in the outdoor unit to connect to the indoor unit.

5. The air conditioning system according to claim 1, wherein the information on the refrigerant filling amount includes a rated capacity of the outdoor unit.

6. The air conditioning system according to claim 1, wherein the information on the refrigerant filling amount includes a maximum filling capacity up to which the refrigerant circuit is allowed to be filled with the refrigerant.

7. The air conditioning system according to claim 6, wherein the maximum filling capacity is calculated on a basis of a standard refrigerant filling amount.

8. The air conditioning system according to claim 1, wherein the detector is brought into the energized state or the non-energized state on a basis of the information on the refrigerant filling amount when the outdoor unit is powered on.

9. The air conditioning system according to claim 1, wherein the detector in the non-energized state can be brought into the energized state.

10. An indoor unit of an air conditioning system comprising:
    an indoor heat exchanger included in a refrigerant circuit; and
    a detector configured to detect leakage of a refrigerant,
    wherein the detector is configured to switch between an energized state and a non-energized state on a basis of information on a refrigerant filling amount by which the refrigerant circuit is filled with the refrigerant.

* * * * *